United States Patent
Tong et al.

(10) Patent No.: US 10,041,378 B2
(45) Date of Patent: Aug. 7, 2018

(54) SYSTEMS AND METHODS FOR ADJUSTING FLOOR PRESSURE LEVELS TO IMPROVE COMBINED CYCLE PLANT STARTUP

(71) Applicant: General Electric Company, Schenectady, NY (US)

(72) Inventors: Leslie Yung Min Tong, Roswell, GA (US); Raub Warfield Smith, Ballston Lake, NY (US); Diego Fernando Rancruel, Greenville, SC (US); Erhan Karaca, Ballston Lake, NY (US); Charles Michael Jones, Ballston Lake, NY (US); Bryan Michael Jones, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 577 days.

(21) Appl. No.: 14/592,222

(22) Filed: Jan. 8, 2015

(65) Prior Publication Data

US 2016/0201518 A1 Jul. 14, 2016

(51) Int. Cl.
*F01K 13/02* (2006.01)
*F01K 23/10* (2006.01)

(52) U.S. Cl.
CPC .......... *F01K 13/02* (2013.01); *F01K 23/108* (2013.01); *Y02E 20/16* (2013.01)

(58) Field of Classification Search
CPC . F02C 6/18; F01K 13/02; F01K 23/10; F01K 23/106; F01K 23/108; F01K 17/025; Y02E 20/16

USPC ...................................... 60/774, 39.182, 266
See application file for complete search history.

(56) References Cited

U.S. PATENT DOCUMENTS

| | | | |
|---|---|---|---|
| 6,588,198 B2 | 7/2003 | Stats | |
| 2004/0013511 A1 | 1/2004 | Brackenhammer et al. | |
| 2007/0227154 A1* | 10/2007 | Pelini | F02C 3/305 60/772 |
| 2010/0305768 A1* | 12/2010 | Holt | F01K 13/02 700/288 |
| 2011/0209479 A1 | 9/2011 | Tong et al. | |
| 2012/0233978 A1* | 9/2012 | Chillar | F01D 25/10 60/39.182 |

* cited by examiner

*Primary Examiner* — Phutthiwat Wongwian
*Assistant Examiner* — Loren Edwards
(74) *Attorney, Agent, or Firm* — Armstrong Teasdale LLP (57) ABSTRACT

A method for adjusting startup floor pressure levels of HRSG steam circuits is implemented by a pressure controlling computing device including a processor and a memory. The method includes receiving a plurality of measured plant operating values associated with a HRSG steam circuit, identifying a plurality of candidate pressure levels for use in pressurizing the HRSG steam circuit, determining a calculated steam velocity level for each of the plurality of candidate pressure levels, identifying a steam velocity limit for a steam piping section of the HRSG steam circuit, selecting a lowest pressure level of the plurality of candidate pressure levels, wherein the lowest pressure level is associated with a determined calculated steam velocity level that does not exceed the identified velocity limit, and pressurizing the HRSG steam circuit to the selected lowest pressure level.

21 Claims, 6 Drawing Sheets

SYSTEMS AND METHODS FOR ADJUSTING FLOOR PRESSURE LEVELS TO IMPROVE COMBINED CYCLE PLANT STARTUP

BACKGROUND

The present disclosure relates generally to power generation systems and, more specifically, to systems and methods for adjusting floor pressure levels of heat recovery steam generators ("HRSGs") during combined cycle plant startup to improve the speed and efficiency of the combined cycle plant startup.

At least some known power generation systems are combined cycle plants that include a multi-pressure heat recovery steam generator (HRSG) that uses combustion exhaust gas to generate progressively lower pressure steam as the exhaust gas is cooled. Relatively high grade heat at an exhaust gas inlet to the HRSG is capable of generating relatively high pressure steam in a high pressure stage or section of the HRSG. After heat is removed from the exhaust gas in the high pressure stage, the exhaust gas is channeled to an intermediate pressure stage where the relatively cooler exhaust gas is capable of generating a relatively lower pressure or intermediate pressure steam. The exhaust gas is then channeled to a low pressure stage of the HRSG to generate a low pressure steam.

During a combined cycle plant startup, a pressure limit ("floor pressure") value is typically required at each section of the HRSG for proper operation. Establishing operation at these floor pressure levels is a pre-condition for initiating steam turbine admission. To pressurize to the floor pressure, the HRSG is generally sealed (i.e., bypass valves are closed) during the initial portion of the gas turbine startup. As pressure builds the only steam flow is from condensation inside steam pipes and HRSG tubing. Significant steam flow only begins when floor pressure is reached and bypass valves begin opening to control to floor pressure. While initial pipe warming occurs as steam condenses, full temperature above saturation temperature can only be achieved after steam flow is established. Since uniform steam pipe pre-warming depends on the presence of steam flows, establishing steam flow sooner reduces the time required to pre-warm the steam pipes to a suitable level appropriate to initiate steam turbine operation. Known methods for reducing start times involve the use of mechanical means (e.g., using faster rotor acceleration rates or plant loading rates), or expensive equipment specifically installed to decrease metal warming times such as steam pre-warming lines or trace heating. In such known methods, significant physical or capital investment is required to enable such reduced start times.

Accordingly, systems and methods for enabling faster steam availability and faster initial warming of the steam piping that avoid incurring the costs associated with known systems and methods are desirable. The described invention concerns a means of controlling to that lower startup floor pressure at key operating points during a startup to provide such benefits.

BRIEF DESCRIPTION

In one aspect, a method for adjusting floor pressure levels of HRSG steam circuits is provided. The method is implemented by a pressure controlling computing device including a processor and a memory. The method includes receiving a plurality of measured plant operating values associated with a HRSG steam circuit, identifying a plurality of candidate pressure levels for use in pressurizing the HRSG steam circuit, determining a calculated steam velocity level for each of the plurality of candidate pressure levels, identifying a steam velocity limit for a steam piping section of the HRSG circuit, selecting a lowest pressure level of the plurality of candidate pressure levels, wherein the lowest pressure level is associated with a determined calculated steam velocity level that does not exceed the identified velocity limit, and pressurizing the HRSG steam circuit to the selected lowest pressure level.

In another aspect, a pressure controlling computing device for adjusting floor pressure levels of HRSG steam circuits is provided. The pressure controlling computing device includes a processor in communication with a memory. The processor is configured to receive a plurality of measured plant operating values associated with a HRSG steam circuit, identify a plurality of candidate pressure levels for use in pressurizing the HRSG steam circuit, determine a calculated steam velocity level for each of the plurality of candidate pressure levels, identify a steam velocity limit for a steam piping section of the HRSG circuit, select a lowest pressure level of the plurality of candidate pressure levels, wherein the lowest pressure level is associated with a determined calculated steam velocity level that does not exceed the identified velocity limit, and pressurize the HRSG steam circuit to the selected lowest pressure level.

In yet another aspect, at least one non-transitory computer-readable storage media having computer-executable instructions embodied thereon for adjusting floor pressure levels of HRSG steam circuits is provided. When executed by at least one processor of a pressure controlling computing device, the computer-executable instructions cause the processor to receive a plurality of measured plant operating values associated with a HRSG steam circuit, identify a plurality of candidate pressure levels for use in pressurizing the HRSG steam circuit, determine a calculated steam velocity level for each of the plurality of candidate pressure levels, identify a steam velocity limit for a steam piping section of the HRSG circuit, select a lowest pressure level of the plurality of candidate pressure levels, wherein the lowest pressure level is associated with a determined calculated steam velocity level that does not exceed the identified velocity limit, and pressurize the HRSG steam circuit to the selected lowest pressure level.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The methods and systems described herein facilitate a more efficient start-up of a combined cycle plant by adjusting the pressure floor used to determine the minimum pressure level (alternately referred to as a minimum pressure level setpoint for starting a steam turbine) a steam turbine. Specifically, the methods and systems described herein facilitate adjusting a "floor pressure" to a lower level (a "sub-floor pressure") that allows for faster steam availability to pre-warm pipes and accelerate steam turbine admission. In an example embodiment, an HP section is pressurized to the sub-floor pressure and a bypass valve is opened to allow for steam flow and pre-warming of pipes. Therefore, the steam flow and pre-warming occurs earlier than would otherwise occur if the HP section was pressurized to floor pressure. Accordingly, the duration of the combined cycle plant startup may be minimized.

Faster start-up times enhance system and plant effectiveness by reducing fuel burn and emissions. The methods and systems avoid costs associated with other known methods of reducing start times such as through mechanical means (e.g., using faster rotor acceleration rates or plant loading rates), or through expensive equipment specifically installed to increase metal warming times such as steam pre-warming lines or trace heating. In such known methods, significant physical or capital investment is required to allow for such reduced start times.

The technical effects of the systems and methods described herein can be achieved by performing at least one of the following steps: (a) receiving a plurality of measured plant operating values associated with a HRSG steam circuit; (b) identifying a plurality of candidate pressure levels for use in pressurizing the HRSG steam circuit; (c) determining a calculated steam velocity level for each of the plurality of candidate pressure levels; (d) identifying a steam velocity limit for a steam piping section of the HRSG steam circuit; (e) selecting a lowest pressure level of the plurality of candidate pressure levels, wherein the lowest pressure level is associated with a determined calculated steam velocity level that does not exceed the identified velocity limit; (f) pressurizing the HRSG steam circuit to the selected lowest pressure level; (g) opening at least one steam bypass valve associated with the HRSG steam circuit upon pressurizing the HRSG steam circuit to the selected lowest pressure level; (h) receiving a plurality of pipe and steam temperature data associated with each section of the HRSG steam circuit; (i) identifying an admission temperature level associated with the steam turbine section; (j) determining that a steam temperature level meets the admission temperature level, the steam temperature level associated with the plurality of steam temperature data; (k) initiating steam admission to the steam turbine section; (l) identifying a pressure buffer associated with the HRSG steam circuit; (m) adjusting the selected lowest pressure level with the pressure buffer; (n) monitoring the measured plant operating values associated with the HRSG steam circuit to identify a variance between actual operating values and target operating values; (o) dynamically adjusting the selected lowest pressure level based on the identified variance; (p) identifying a projected drum swell associated with the selected lowest pressure level; (q) validating that the drum swell does not exceed a drum swell threshold; (r) identifying a performance impact on a mist eliminator associated with steam-water separation efficiency at the selected lowest pressure level; and (s) validating that the performance impact does not exceed a steam-water separation efficiency threshold.

Steam turbines prefer steam supply temperatures to be at or warmer (within a certain bandwidth) than the steam turbine metal temperature during plant startup regardless of whether the startup is hot, warm, or cold. These temperatures are needed in order to prevent the steam turbine from experiencing excessive stress levels caused by undesired and excessive mismatch of the steam and rotor metal temperatures. Even if steam produced by the HRSG is at high temperatures, cold steam pipes have a cooling effect on the steam flows passing through it. The steam pipes must thus be pre-warmed through the continuous flow of hot steam until pipe temperatures increase sufficiently for the given type of start. Accordingly, speeding up the availability of steam impacts the speed at which those pipes increase in temperature which impacts the speed of the admission of the steam turbine. Temperature sensors at stations along the steam pipes are configured to detect that HRSG steam circuit are met and steam turbine admission may begin.

Therefore, earlier production and availability of steam is needed to allow for a faster startup process because ensuring adequate levels of pipe warming is necessary. In most HRSGs, there is no alternative heat source that may substitute for steam to accomplish these goals. As a result, without the usage of additional heating equipment, faster startup cannot typically be accomplished with known methods.

In the example embodiment, a sub-floor pressure level is identified by a pressure controlling computing device and used as a temporary startup pressure set-point that is at a level lower than the design floor pressure. The design floor pressure ("floor pressure") may be determined as a constant value without consideration of plant operating conditions. The pressure controlling computing device uses the sub-floor pressure during the initial phase of startup. As the startup is underway, steam pressures are brought to and held at this low startup-floor level (or "sub-floor level") to promote pipe warming which shortens the elapsed time required to initiate steam turbine startup. The HRSG is bottled-up in the pressurization period because bypass valves are typically fully closed or may be slightly opened to limit the pressurization rate in the drum if such a rate is exceeded. Upon pressurization to the sub-floor, the pressure controlling computing device allows steam flow to initiate as the sub-floor pressure is maintained. As steam flow continues, the pipes are pre-warmed until steam turbine admission temperatures are met. In one example, a plant with a design high pressure floor level of 940 psia may have a sub-floor level of 800 psia. Assuming a dP/dt rate of 45 psid/min, the steam flow to the turbine may be admitted 3.1 mins earlier than would be available if the floor level of 940 psia is used.

In the example embodiment, these methods may apply to the intermediate pressure section or any other pressure sections of the combined cycle. To further accelerate steam availability and ensure design limits associated with low pressure operation are respected, the pressure set-point can be dynamically adjusted to limit flow to account for flow velocity limits or the reverse thereof. Such improved pre-warming ability may be used for any steam turbine start methods (e.g., using IPT steam to roll, or HPT steam, or any combination thereof). Such dynamic adjustment may also facilitate the slowing of further pressurization as bypasses are activated, thus also facilitating faster GT loading depending upon the size of bypasses.

In the exemplary embodiment, a pressure controlling computing device is used to manage floor pressures and define "sub-floor" pressures in order to optimize the time at which steam flows are available to provide pipe warming and reduce overall startup time for the combine cycle plant. The sub-floor pressure level is set based on identifying expected steam velocities for a steam supply line based on a plurality of measured input parameters and design HRSG and steam piping geometry and comparing the expected steam velocities to velocity limits for the steam pipes.

More specifically, the pressure controlling computing device may use a plurality of sensors to identify a current plant operating state represented by a plurality of measured plant operating values in order to determine calculated steam velocities for flow, pressure, and temperature data of superheater exit steam. Such operating values may alternately be referred to as "plant operating state values", and "operating values." Specifically, as described herein, the pressure controlling computing device receives a plurality of input parameters from a plurality of sensors, data sources, or model simulations. The plurality of input parameters may include any suitable data including measured plant operating values, plant design information, and other plant status information. In at least some examples, the plurality of input parameters include heat balance values such as temperature levels, pressure levels, pressure differential levels, mass flow rates, and enthalpies. Further, the pressure controlling computing device receives plant design information including pipe geometry and maximum allowable steam velocity levels.

The pressure controlling computing device identifies at least one candidate sub-floor pressure level as a potential sub-floor pressure level. The pressure controlling computing device then processes the plurality of input parameters and the at least one candidate sub-floor pressure level to determine at least one calculated steam velocity level. The pressure controlling computing device may accordingly use any suitable computer model, algorithm or formula to estimate the at least one calculated velocity level. In at least some examples, the velocity level may be determined as described in Equation 1, below:

$$\vec{V} = \frac{\dot{m}}{\rho A} \qquad \text{Equation 1}$$

In Equation 1, $\dot{m}$ represents mass flow, $\rho$ represents steam density (calculated using known steam properties or values for the current pressure and temperature), and A represents the cross-sectional area of the steam pipe. A may further be calculated based on plant design data and specifically based on the inner diameter of the steam pipe. In an example embodiment, A may be determined as described in Equation 2, below, wherein ID represents the inner diameter of the steam pipe:

$$A = \frac{\pi \times ID^2}{4} \qquad \text{Equation 2}$$

The pressure controlling computing device further identifies a velocity limit describing the maximum acceptable velocity for the steam in each steam supply pipe circuit. The maximum acceptable velocity is set to avoid impact from high velocity steam flow including increased maintenance, equipment lifespan, noise, and equipment reliability. Typically, the maximum acceptable velocity is used to determine the floor pressure levels for steady state operation. However, the pressure controlling computing device is configured to determine sub-floor pressure levels that yield startup steam velocity levels that are within the velocity limit. As long as steam flow for pipe warming is below the steady state values the sub-floor pressures can be below the normal operation floor pressures. Accordingly, the pressure controlling computing device compares the calculated velocity level to the velocity limit. In the example embodiment, the velocity limit is retrieved from a memory device, a database, or any other suitable storage in communication with the pressure controlling computing device.

If the pressure controlling computing device determines that at least one of the calculated velocity levels exceeds the velocity limit, the associated candidate pressure level may be rejected from consideration. The pressure controlling computing device is configured to identify the candidate pressure level yielding the highest acceptable velocity level that does not exceed the velocity limit. In some cases, a buffer or a threshold may be set so that the candidate pressure level identified is one that has an additional operating margin to further reduce the risk of exceeding an adjusted velocity limit due to the buffer or threshold. In at least one example, candidate pressure levels may be determined as indicated below. Given a target velocity, $\vec{V}_{Target}$, a target density of $\rho_{Target}$ may be determined as described in Equation 3, below:

$$\rho_{Target} = \frac{\dot{m}}{\vec{V}_{Target} \times A} \qquad \text{Equation 3}$$

Based on $\rho_{Target}$, a target pressure $P_{Target}$ may be calculated using known steam properties based on $\rho_{Target}$, and temperature. Further, a new candidate pressure level $P_C$ adjusted by a buffer B may be determined as described in Equation 4, below:

$$P_C = P_{TARGET} - B \qquad \text{Equation 4:}$$

The pressure controlling computing device uses the identified candidate pressure level to direct the startup of the combined cycle plant. Specifically, in operation, the pressure controlling computing device pressurizes a section (e.g., the HP section) to the identified candidate pressure level. The pressure controlling computing device is in communication with sensors that monitor the pressure levels of the system and the pressure controlling computing device may therefore monitor pressures of the section. Upon pressurization, the pressure controlling computing device controls the opening of a bypass valve so that the candidate pressure level (i.e., the sub-floor pressure level) is maintained. In other words, the pressure controlling computing device is configured to open the bypass valve such that the loss of pressure caused by the opening of the bypass valve does not cause the section to drop below the sub-floor pressure level. As the bypass valve is opened, steam flows through the pipes and pre-warms the pipes of the system. The pressure controlling computing device is also in communication with temperature sensors that monitor the temperature of the pipes. The pressure controlling computing device monitors the temperature of the pipes via such sensors and determines that the pipes have been pre-warmed to an acceptable admission temperature level. The acceptable admission temperature level may be specific to the system or a sub-section of the system. In the example embodiment, the acceptable admission temperature level may be stored at a memory, a database, or any other suitable storage in communication with the pressure controlling computing device. Upon determining that the steam and/or pipe temperature meets (or will soon meet) the acceptable admission temperature level, the pressure controlling computing device may further raise the pressure level from the candidate pressure level (i.e., sub-floor pressure level) to the floor pressure level or to another pressure level acceptable for the steam turbine and steam turbine operation may proceed.

In some examples, the pressure controlling computing device also considers in additional factors in identifying the sub-floor pressure level. In one example, the pressure controlling computing device identifies a projected drum swell associated with a selected sub-floor pressure level and verifies that the drum swell does not exceed an acceptable drum swell threshold. In a second example, the pressure controlling computing device identifies a performance impact on a mist eliminator associated with the steam turbine section based on the selected sub-floor pressure level. Similarly, the pressure controlling computing device verifies that the mist eliminator performance impact does not exceed a performance impact threshold as it relates to the steam-water separation efficiency of the mist eliminator. The drum swell threshold may be specific to the model and manufacturer of the HRSG and the threshold may be stored at a memory, database, or other suitable storage in communication with the pressure controlling computing device. Similarly, the performance impact threshold may be specific to the mist eliminator and may be stored at a memory, database, or other suitable storage in communication with the pressure controlling computing device.

In at least some embodiments, the pressure controlling computing device is configured to dynamically adjust the sub-floor pressure level based on steam velocities in the steam supply piping in order to optimize steam flow for the reheater system. Accordingly, the pressure controlling computing device is configured to monitor process state point measurements associated with the steam piping to identify a variance in steam velocity and dynamically adjust the selected lowest pressure level based on the identified variance.

In the example embodiment, the pressure controlling computing device controls the startup of a high pressure steam turbine section with a cascading bypass and a steam turbine with an IPT start. The high pressure steam turbine section pressurizes from the sub-floor to the design floor (after pre-warming pipes) during IPT admission for steam turbine roll/synchronization.

As described, the pressure controlling computing device is configured to operate various devices of a steam system. Accordingly, the pressure controlling computer device is configured to control bypass valves, steam turbine admissions, and other operational aspects of the steam system.

The pressure controlling computing device may be used to facilitate a conventional plant startup warming procedure where the primary means of warming the steam piping leading to the steam turbine is by drain line steam flow or in conjunction with plants that use dedicated pre-warming systems as its primary means of warming the steam piping. In such alternative cases, HRSG generated steam is used as an alternative heat source for pipe warming.

The systems and methods described may be used with pressure sections of a HRSG (HP, IP, LP, LLP or any other suitable section.) However, the example embodiments focus on HP and IP sections.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital media, with the sole exception being a transitory, propagating signal.

Described herein are computer systems such as pressure controlling computing devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, the terms "software" and "firmware" are interchangeable, and include any computer program stored in memory for execution by devices that include, without limitation, mobile devices, clusters, personal computers, workstations, clients, and servers.

The systems and processes are not limited to the specific embodiments described herein. In addition, components of each system and each process can be practiced independent and separate from other components and processes described herein. Each component and process also can be used in combination with other assembly packages and processes.

Figure 1:
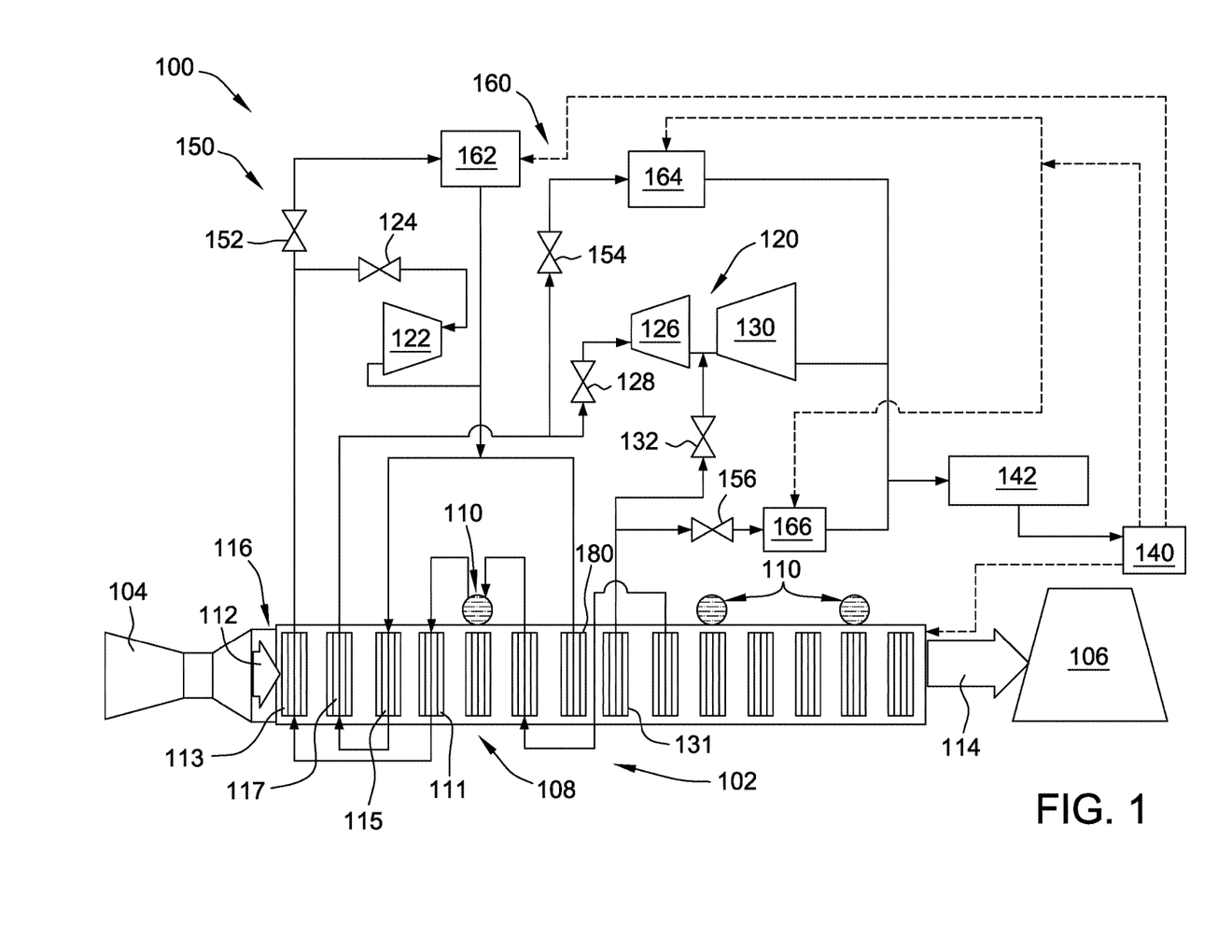
FIG. 1 is a schematic block diagram of an exemplary steam generation facility.

FIG. 1 is a schematic block diagram of an exemplary gas turbine combined cycle facility 100. In the exemplary embodiment, gas turbine combined cycle facility 100 includes at least one steam generator, that is, a heat recovery steam generator (HRSG) 102. HRSG 102 is coupled in flow communication with a gas turbine exhaust duct 116 and an exhaust stack 106. Also, in the exemplary embodiment, HRSG 102 includes a plurality of water-steam element bundles 108 and a plurality of water-steam separation units 110. Bundles 108 and units 110 are coupled in flow communication in an orientation that facilitates heating water from subcooled conditions to superheated steam conditions within bundles 108, while separating water (not shown) from steam (not shown) within separation units 110. Bundles 108 include at least one high-pressure (HP) superheater, that is, a first HP superheater (HPSH-1) 111 that is coupled in flow communication with a second HP superheater (HPSH-2) 113. Bundles 108 also include at least one intermediate-pressure (IP) superheater, that is, an IP superheater 180 that is coupled in flow communication with a first reheat superheater (RHSH-1) 115 that is coupled in flow communication with a second reheat superheater (RHSH-2) 117. Bundles 108 further include at least one low-pressure (LP) superheater (LPSH) 131. Each superheater 111, 113, 115, 117, and 131 is described in more detail below with respect to configuration and functionality within gas turbine combined cycle facility 100. Water and steam are heated to superheated conditions via heat transfer from hot gases channeled from gas turbine 104 via exhaust manifold 116 through HRSG 102. Stack 106 is coupled in flow communication with HRSG 102 to enable cooled exhaust gases 114 to be exhausted via stack 106.

Gas turbine combined cycle facility 100 also includes a steam turbine system 120. In the exemplary embodiment, system 120 includes a high-pressure (HP) steam turbine 122 that is flow coupled to HRSG 102, or more specifically, HPSH-2 113, via at least one HP admission control valve 124, as well as IP turbine 126 via its rotor shaft. Also, in the exemplary embodiment, steam turbine system 120 includes an intermediate-pressure (IP) steam turbine 126 that is coupled to HRSG 102, or more specifically, RHSH-2 117, via at least one IP admission control valve 128. Moreover, in the exemplary embodiment, steam turbine system 120 includes a low-pressure (LP) steam turbine 130 that is coupled in flow communication with IP steam turbine 126 and that is coupled to LPSH 131 within HRSG 102 via at least one LP admission control valve 132.

In the exemplary embodiment gas turbine combined cycle facility 100 also includes a combined condensate-feedwater system 140. In the exemplary embodiment, system 140 includes any number of condensate pumps, feedwater pumps, deaerating units, piping, valving, and any other components known in the art (none shown) that enables gas turbine combined cycle facility 100 to function as described herein. Also, in the exemplary embodiment, system 140 is coupled in flow communication with HRSG 102 and with a steam condensing unit 142.

Steam generation facility 100 also includes a steam bypass system 150. In the exemplary embodiment, steam bypass system 150 includes an HP bypass pressure control valve (PCV) 152 that is coupled in flow communication with HRSG 102, or more specifically, HPSH-2 113. Also, in the exemplary embodiment, steam bypass system 150 includes an IP bypass PCV 154 that is coupled in flow communication with HRSG 102, or more specifically, RHSH-2 117. Moreover, in the exemplary embodiment, steam bypass system 150 includes a LP bypass PCV 156 that is coupled in flow communication with HRSG 102. Also, in the exemplary embodiment, system bypass system 150 includes at least one condensate extraction pump (CEP), at least one high pressure pump and at least one intermediate pressure pump that is coupled in flow communication with steam condensing unit 142.

In the exemplary embodiment, gas turbine combined cycle facility 100 is an electric power generation facility. Alternatively, gas turbine combined cycle facility 100 may be any facility that enables the system to function as described herein. Also, in the exemplary embodiment, facility 100 includes at least one steam generator, i.e., HRSG 102. Alternatively, facility 100 may include any type of steam generator that enables the system to function as described herein.

During operation of gas turbine combined cycle facility 100, hot exhaust gases 112 are channeled from gas turbine exhaust manifold 116 through HRSG 102. As gases 112 flow about water-steam element bundles 108, heat is transferred from gases 112 to water and/or steam flowing through bundles 108. As heat is transferred from gases 112, such gases 112 are cooled prior to being exhausted via stack 106.

Also, during operation, subcooled water is channeled from steam condensing unit 142 to HRSG 102 via combined condensate-feedwater system 140. Subcooled water receives heat transferred from exhaust gases and the temperature of such subcooled water is elevated. The water temperature increases as it flows through successive water-steam element bundles 108, wherein the water is eventually heated to saturation conditions. As steam is formed within the saturated water, the steam and water are separated via separation units 110, wherein water is returned to bundles 108 for subsequent heating and steam formation, while steam is channeled to subsequent bundles 108 to receive additional heat transfer to superheated steam conditions. Specifically, steam that is at least partially superheated is channeled to HPSH-1 111, prior to being channeled to HPSH-2 113, to form high-pressure (HP) superheated main steam (not shown). In the exemplary embodiment, such superheated HP main steam has thermodynamic conditions including, but not limited to, temperatures and pressures that enable operation of gas turbine combined cycle facility 100 as described herein.

Superheated HP main steam is channeled to HP admission control valve (ACV) 124 for admission to HP steam turbine 122. Heat energy within the superheated HP main steam is translated to rotational kinetic energy within HP steam turbine 122. Superheated intermediate pressure (IP) exhaust steam is channeled from HP steam turbine 122 to HRSG 102, or more specifically, to RHSH-1 115, for subsequent reheating. In the exemplary embodiment, such IP exhaust steam has thermodynamic conditions including, but not limited to, temperatures and pressures that enable operation of gas turbine combined cycle facility 100 as described herein.

IP exhaust steam is channeled to RHSH-1 115, prior to being channeled to RHSH-2 117 to form intermediate-pressure (IP) superheated reheat steam. In the exemplary embodiment, such superheated IP reheat steam has thermodynamic conditions including, but not limited to, temperatures and pressures that enable operation of gas turbine combined cycle facility 100 as described herein.

Superheated IP reheat steam is channeled to IP admission control valve (ACV) 128 for admission to IP steam turbine 126. Heat energy within the superheated IP reheat steam is translated to rotational kinetic energy within IP steam turbine 126. Superheated low pressure (LP) exhaust steam is channeled from IP steam turbine 126 to LP turbine 130. Moreover, superheated LP steam from LPSH 131 is channeled to LP steam turbine 130 via LP ACV 132. Heat energy within the superheated LP steam is translated to rotational kinetic energy within LP steam turbine 130. LP exhaust steam is channeled from LP steam turbine 130 to steam condensing unit 142 for recycling through the thermodynamic cycle described herein.

Steam bypass system 150 may also include an attemperation system 160. In the exemplary embodiment, attemperation system 160 includes an HP portion 162 that is coupled in flow communication with HP PCV 152. Also, in the exemplary embodiment, attemperation system 160 includes an IP portion 164 that is coupled in flow communication with IP PCV 154. Further, in the exemplary embodiment, attemperation system 160 includes an LP portion 166 that is coupled in flow communication with LP PCV 156. Each portion 162, 164, and 166 is coupled in flow communication with condensate-feedwater system 140. Attemperation system 160 and associated portions 162, 164, and 166 are described in more detail below.

Figure 2:
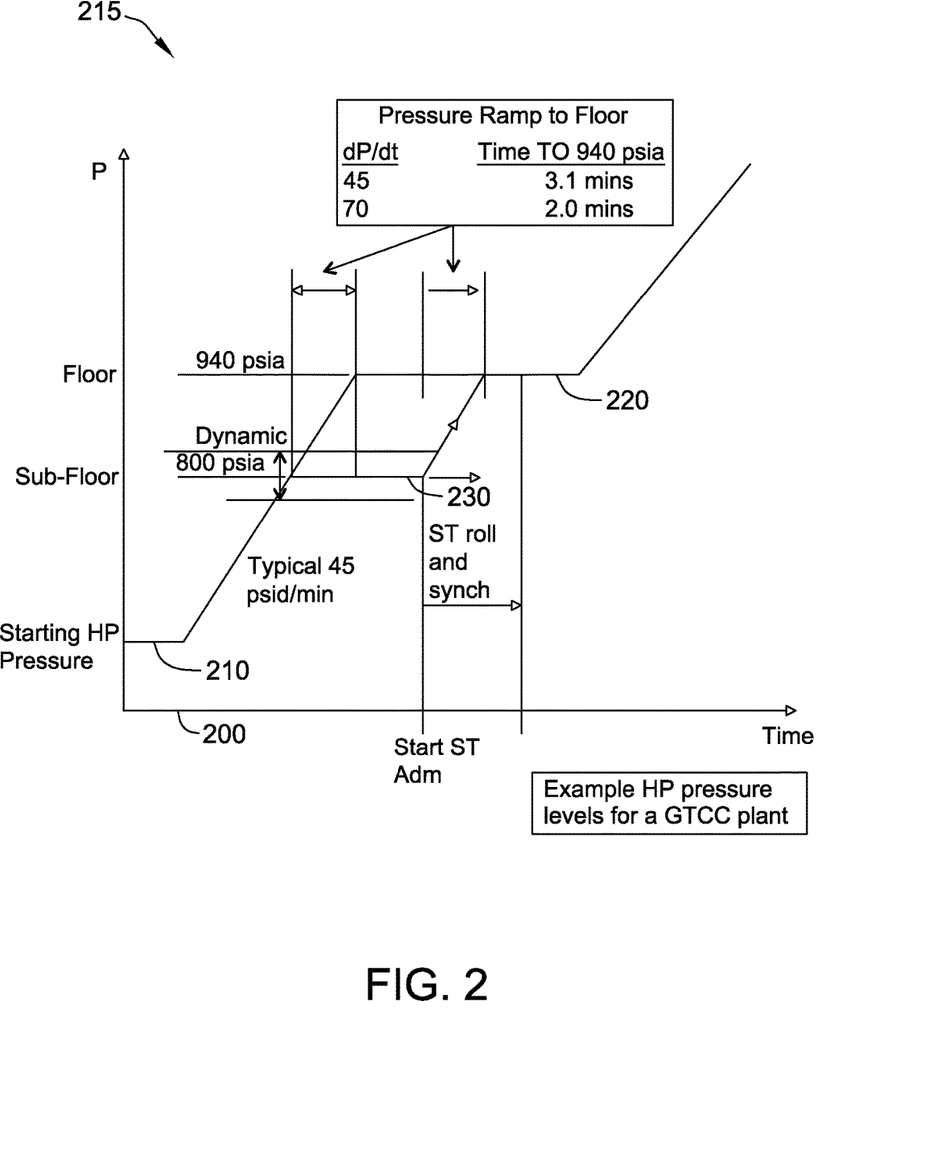
FIG. 2 is a chart illustrating an exemplary process of adjusting the floor pressure to a "sub-floor" pressure during combined cycle plant startup using the exemplary steam generation facility shown in FIG. 1.

FIG. 2 is a chart illustrating an exemplary process 215 of adjusting the floor pressure to a "sub-floor" pressure during combined cycle plant startup using gas turbine combined cycle facility 100 (shown in FIG. 1). Specifically, in the example embodiment, process 215 shows the process of pressurizing HP steam over a period of time 200. Initially, HP steam is at a starting HP pressure level 210. In operation, the pressure controlling computing device (shown in FIG. 3) determines a sub-floor pressure level 230 and pressurizes HP steam to this level rather than floor pressure level 220. Accordingly, after HP steam is pressurized to sub-floor pressure level 230, pressure controlling computer device opens a bypass valve to establish steam flow and allow for pre-warming of the pipes. As a result, HP steam flow will begin and end pre-warming earlier than it would if floor pressure level 220 were used. In the example embodiments, as shown, HP steam may achieve steam turbine admission at 2.0 minutes or 3.1 minutes earlier than steam turbine admission if floor pressure level 220 is used.

Figure 3:
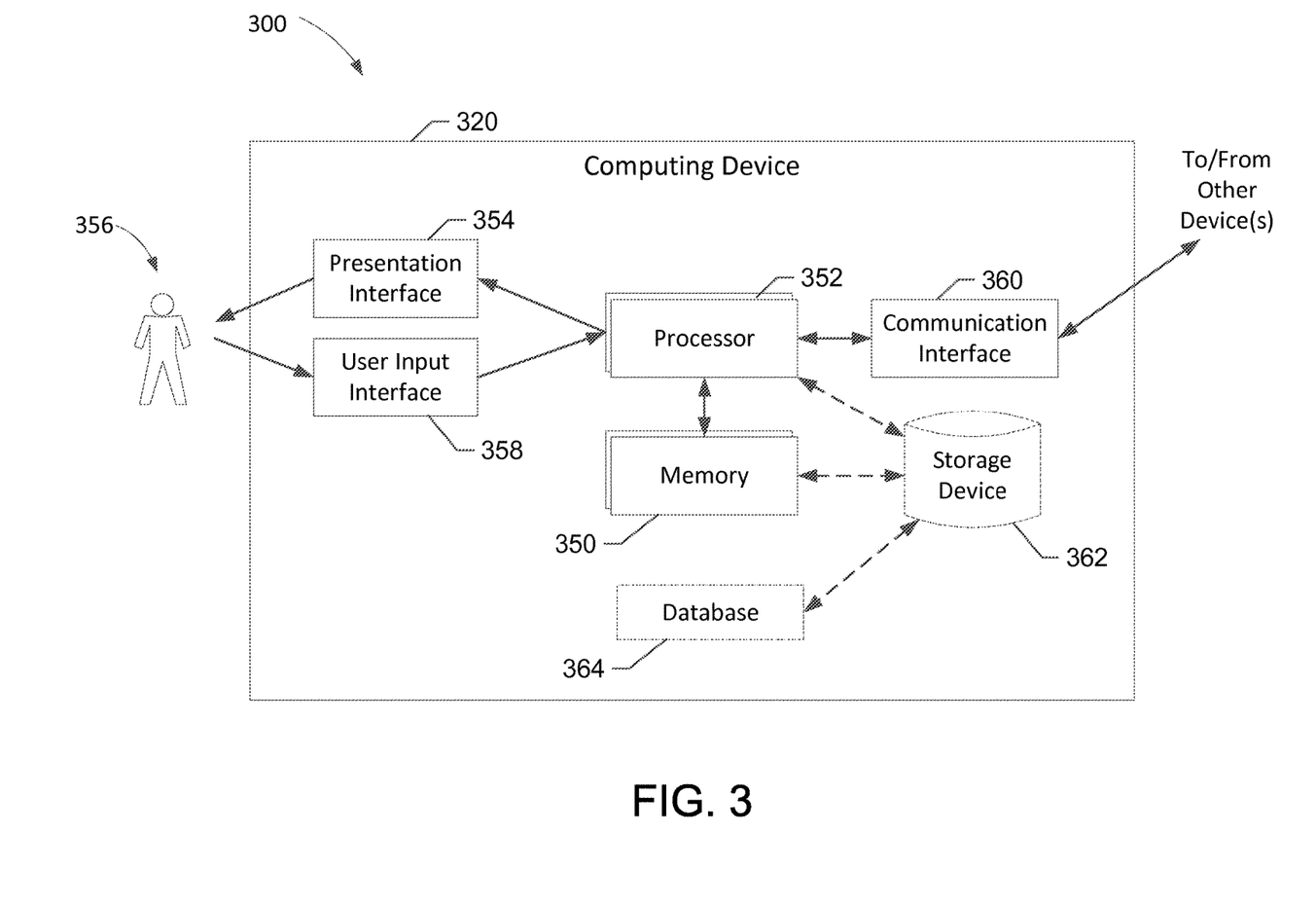
FIG. 3 is a block diagram of an exemplary computing system that may be used to adjust floor pressure levels during combined cycle plant startup referencing the exemplary steam generation facility shown in FIG. 1.

FIG. 3 is a block diagram 300 of an exemplary computing system 320 that may be used to control gas turbine combined cycle facility 100 and components thereof including HP steam (both shown in FIG. 1). As described herein, computing system 320 may be alternately referred to as pressure controlling computing system and be configured to facilitate the methods and systems described herein. Alternatively, any computer architecture that enables operation of computing system 320 as described herein may be used.

In the exemplary embodiment, computing system 320 includes a memory device 350 and a processor 352 operatively coupled to memory device 350 for executing instructions. In some embodiments, executable instructions are stored in memory device 350. Computing system 320 is configurable to perform one or more operations described herein by programming processor 352. For example, processor 352 may be programmed by encoding an operation as one or more executable instructions and providing the executable instructions in memory device 350. Processor 352 may include one or more processing units, e.g., without limitation, in a multi-core configuration.

Further, in the exemplary embodiment, memory device 350 is one or more devices that enable storage and retrieval of information such as executable instructions and/or other data. Memory device 350 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Also, in the exemplary embodiment, memory device 350 may be configured to store a variety of schematic data associated with steam generation facility 100 such as, for example, values or other data associated with pipe geometries, maximum velocity limits, and steam turbine admission temperatures.

In some embodiments, computing system 320 includes a presentation interface 354 coupled to processor 352. Presentation interface 354 presents information, such as a user interface and/or an alarm, to a user 356. For example, presentation interface 354 may include a display adapter (not shown) that may be coupled to a display device (not shown), such as a cathode ray tube (CRT), a liquid crystal display (LCD), an organic LED (OLED) display, and/or a hand-held device with a display. In some embodiments, presentation interface 354 includes one or more display devices. In addition, or alternatively, presentation interface 354 may include an audio output device (not shown), e.g., an audio adapter and/or a speaker.

In some embodiments, computing system 320 includes a user input interface 358. In the exemplary embodiment, user input interface 358 is coupled to processor 352 and receives input from user 356. User input interface 358 may include, for example, a keyboard, a pointing device, a mouse, a stylus, and/or a touch sensitive panel, e.g., a touch pad or a touch screen. A single component, such as a touch screen, may function as both a display device of presentation interface 354 and user input interface 358.

Further, a communication interface 360 is coupled to processor 352 and is configured to be coupled in communication with one or more other devices such as, without limitation, another computing system 320, one or more sensors associated with steam generation facility 100. Such sensors (not shown) allow for monitoring of information in steam generation facility 100 including temperature levels, pressure levels, pressure differential levels, mass flow rates, and enthalpies. Further, such sensors facilitate the detection of heat balance values that may be used to determine steam velocity levels. Similarly, such sensors facilitate the monitoring of pressure levels of components of steam generation facility 100 and the temperatures of pipes. Communication interface 360 may include, without limitation, a wired network adapter, a wireless network adapter, a mobile telecommunications adapter, a serial communication adapter, and/or a parallel communication adapter. Communication interface 360 may receive data from and/or transmit data to one or more remote devices. Computing system 320 may be web-enabled for remote communications, for example, with a remote desktop computer (not shown).

Also, presentation interface 354 and/or communication interface 360 are both capable of providing information suitable for use with the methods described herein, e.g., to user 356 or another device. Accordingly, presentation interface 354 and communication interface 360 may be referred to as output devices. Similarly, user input interface 358 and communication interface 360 are capable of receiving information suitable for use with the methods described herein and may be referred to as input devices.

Further, processor 352 and/or memory device 350 may also be operatively coupled to a storage device 362. Storage device 362 is any computer-operated hardware suitable for storing and/or retrieving data, such as, but not limited to, data associated with a database 364. In the exemplary embodiment, storage device 362 is integrated in computing system 320. For example, computing system 320 may include one or more hard disk drives as storage device 362. Moreover, for example, storage device 362 may include multiple storage units such as hard disks and/or solid state disks in a redundant array of inexpensive disks (RAID) configuration. Storage device 362 may include a storage area network (SAN), a network attached storage (NAS) system, and/or cloud-based storage. Alternatively, storage device 362 is external to computing system 320 and may be accessed by a storage interface (not shown).

Moreover, in the exemplary embodiment, database 364 contains a variety of static and dynamic operational data associated with controlling and monitoring steam generation facility 100.

The embodiments illustrated and described herein as well as embodiments not specifically described herein but within the scope of aspects of the disclosure, constitute exemplary means for controlling and monitoring gas turbine combined cycle facility 100 and adjusting a pressure level for pressurizing a section of gas turbine combined cycle facility 100 to a sub-floor level to allow for early pre-warming of the section. For example, computing system 320, and any other similar computer device added thereto or included within, when integrated together, include sufficient computer-readable storage media that is/are programmed with sufficient computer-executable instructions to execute processes and techniques with a processor as described herein. Specifically, computing system 320 and any other similar computer device added thereto or included within, when integrated together, constitute an exemplary means for pressurizing a section of gas turbine combined cycle facility 100 to a sub-floor level to allow for early pre-warming of the section.

Figure 4:
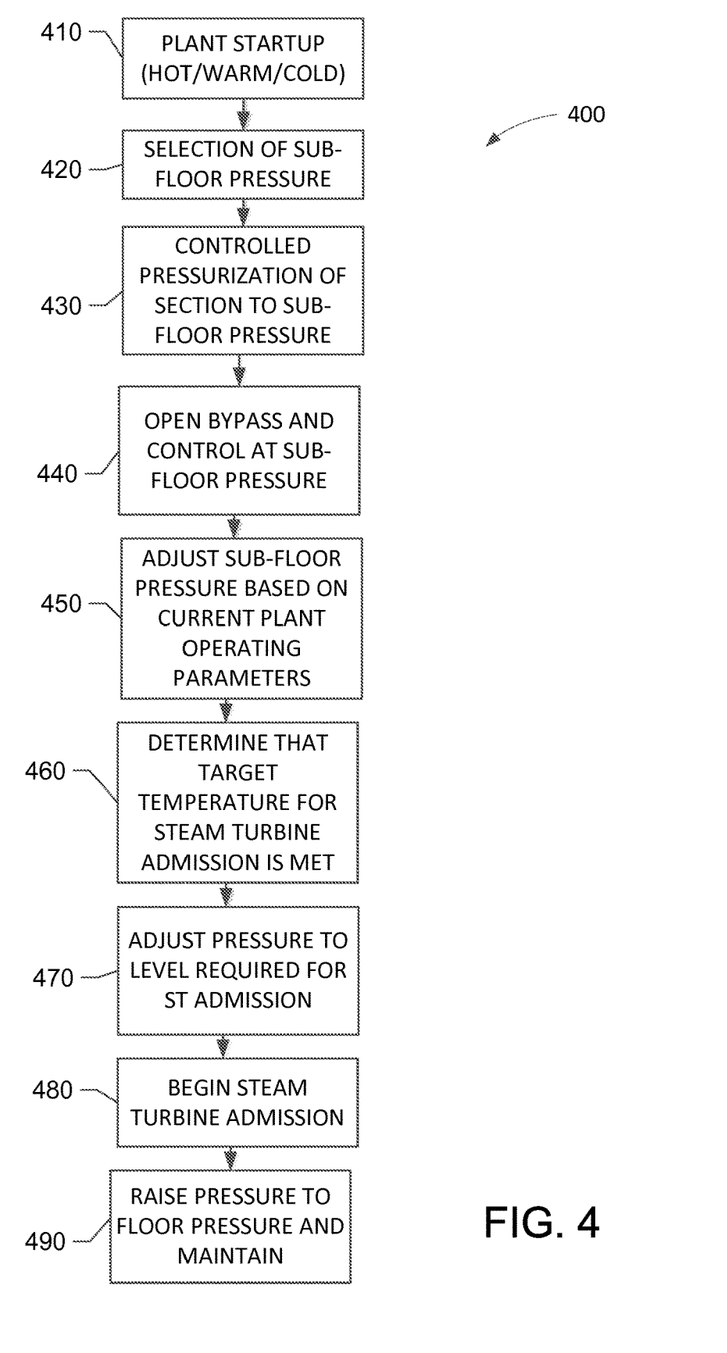
FIG. 4 is a first exemplary method of controlling the exemplary steam generation facility of FIG. 1 using the exemplary computing system of FIG. 3.

FIG. 4 is a first exemplary method 400 of controlling gas turbine combined cycle facility 100 (shown in FIG. 1) using pressure controlling computing device 320 (shown in FIG. 3). As described herein, pressure controlling computing device 320 may initiate plant startup 410. Initiating plant startup 410 may represent pressure controlling computing device 320 initiating the startup of gas turbine combined cycle facility 100 in any suitable startup mode or method including hot startup, warm startup, or cold startup.

Pressure controlling computing device 320 further selects 420 a sub-floor pressure. As described herein, selecting 420 represents identifying a sub-floor pressure level 230 (shown in FIG. 2) associated with an acceptable velocity (i.e., that does not exceed the velocity limit for the pipe section) and that is below floor pressure level 220 (shown in FIG. 2).

Pressure controlling computing device 320 additionally engages in a controlled pressurization 430 of the section to identified sub-floor pressure level 230. After pressurization 430 is accomplished, pressure controlling computing device 320 may open bypass 440 and control the pressure of the section to maintain sub-floor pressure level 230. As described herein, as the bypass is opened, steam flow is initiated and pre-warming begins. Pressure controlling computer device 320 is also configured to adjust 450 sub-floor pressure based on current plant operating parameters. Also as described herein, pressure controlling computing device 320 is in communication with sensors that monitor pipe temperature to determine 460 that a target temperature for steam turbine admission has been met. Upon determining 460, pressure controlling computing device facilitates adjusting 470 the pressure to the level required for steam turbine admission, beginning 480 steam turbine admission and raising pressure 490 to floor pressure level 220 and maintains that pressure level until the steam bypass has closed.

Figure 5:
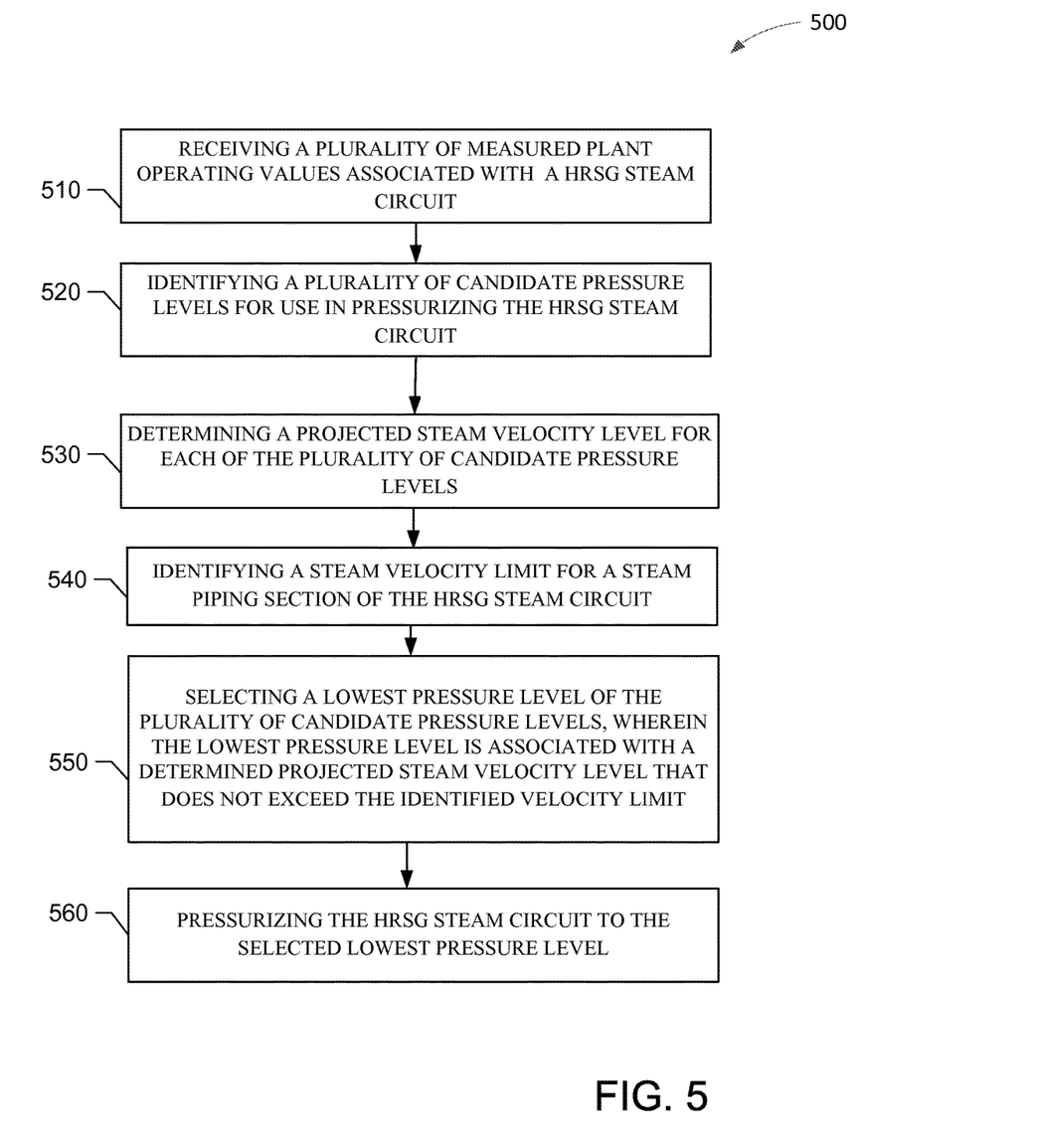
FIG. 5 is a second exemplary method of adjusting the floor pressure of the exemplary steam generation facility of FIG. 1 using the exemplary computing system of FIG. 3.

FIG. 5 is a second exemplary method 500 of adjusting the floor pressure of steam generation facility 100 (shown in FIG. 1) using pressure controlling computing device 320 (shown in FIG. 3). As described herein, pressure controlling computing device 320 is configured to receive 510 a plurality of measured plant operating values associated with a HRSG steam circuit.

Pressure controlling computing device 320 is also configured to identify 520 a plurality of candidate pressure levels for use in pressurizing the HRSG steam circuit. Pressure controlling computing device 320 is further configured to determine 530 a calculated steam velocity level for each of the plurality of candidate pressure levels. Pressure controlling computing device 320 is additionally configured to identify 540 a steam velocity limit for a steam piping section of the HRSG circuit. Pressure controlling computing device 320 is also configured to select 550 a lowest pressure level of the plurality of candidate pressure levels, wherein the lowest pressure level is associated with a determined calculated steam velocity level that does not exceed the identified velocity limit. Pressure controlling computing device is additionally configured to pressurize 560 the HRSG steam circuit to the selected lowest pressure level.

Figure 6:
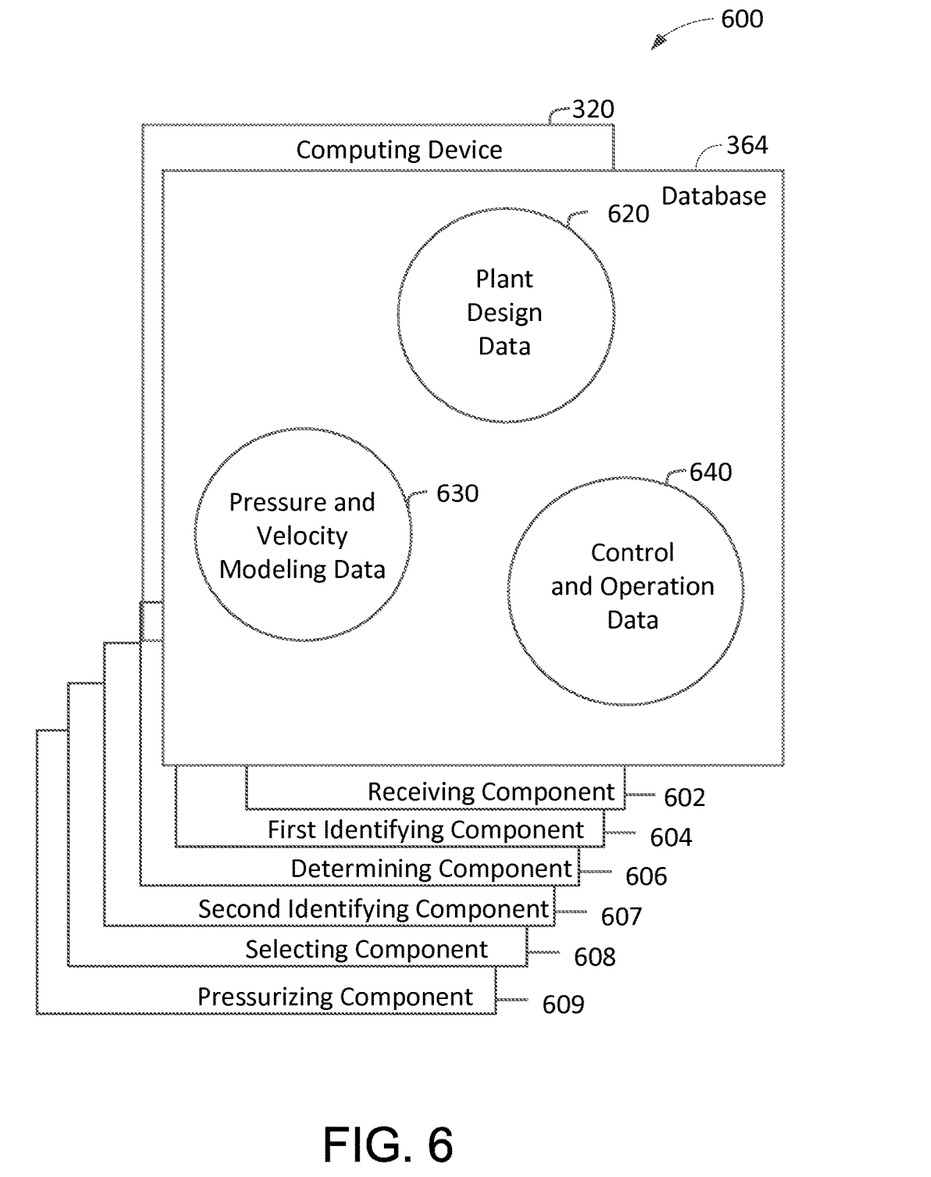
FIG. 6 illustrates an exemplary configuration of a database within a computing device, along with other related computing components, that may be used during analysis of model parameters as described herein.

FIG. 6 illustrates an exemplary configuration 600 of a database 364 within pressure controlling computing device 320, along with other related computing components, that may be used during the control and monitoring processes as described herein. Database 364 is coupled to several separate components within pressure controlling computing device 320, which perform specific tasks.

In the exemplary embodiment, database 364 includes plant design data 620, pressure and velocity modeling data 630, and control and operation data 640. Plant design data 620 includes information associated with the gas turbine combined cycle facility 100 (shown in FIG. 1) including, for example, floor pressure levels, pipe geometry, plant schematic information, velocity and pressure buffers and thresholds, steam turbine admission criteria (including steam turbine admission temperature levels), drum swell tolerances, noise, and mist eliminator tolerances. Pressure and velocity modeling data 630 includes information used to determine sub-floor pressure levels and calculated velocity levels. Control and operation data 640 includes information related to the management and control of gas turbine combined cycle facility 100 including information regarding steam turbine admission, bypass valve controls, startup controls, rolling controls, and synch controls.

Pressure controlling computing device 320 includes a receiving component 602 for receiving a plurality of measured plant operating values associated with a HRSG steam circuit, a first identifying component 604 for identifying a plurality of candidate pressure levels for use in pressurizing the HRSG steam circuit, a determining component 606 for determining a calculated steam velocity level for each of the plurality of candidate pressure levels, a second identifying component 607 for identifying a steam velocity limit for a steam piping section of the HRSG circuit, a selecting component 608 for selecting a lowest pressure level of the plurality of candidate pressure levels, and a pressurizing component 609 for pressurizing the HRSG steam circuit to the selected lowest pressure level.

The embodiments illustrated and described herein, as well as embodiments not specifically described herein, but, within the scope of aspects of the disclosure, constitute exemplary means for adjusting floor pressure levels of HRSG pressure sections. For example, pressure controlling computing device 320, and any other similar computer device added thereto or included within, when integrated together, include sufficient computer-readable storage media that is/are programmed with sufficient computer-executable instructions to execute processes and techniques with a processor as described herein. Specifically, pressure controlling computing device 320 and any other similar computer device added thereto or included within, when integrated together, constitute an exemplary means for adjusting floor pressure levels of HRSG pressure sections.

An exemplary technical effect of the methods, systems, and apparatus described herein includes at least one of: (a) reducing combined cycle plant startup time, (b) allowing for dynamic adjustment of floor pressures based on plant operating conditions, and (c) providing more efficient combined cycle plant startup time without impacting the physical conditions of the HRSG.

Although specific features of various embodiments may be shown in some drawings and not in others, this is for convenience only. In accordance with the principles of the systems and methods described herein, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A pressure controlling computing device for adjusting floor pressure levels of HRSG steam circuits during a pre-warming phase, said pressure controlling computing device comprising a processor in communication with a memory, said processor is programmed to:
   receive a plurality of measured plant operating values associated with a HRSG steam circuit;
   identify a plurality of candidate pressure levels for use in pressurizing the HRSG steam circuit to a steam pressure that is below a floor pressure suitable for steam admission to a steam turbine;
   determine a calculated steam velocity level for each of the plurality of candidate pressure levels;
   identify a steam velocity limit for a steam piping section of the HRSG steam circuit;
   compare each calculated steam velocity level to the identified steam velocity limit;
   identify, based upon the comparison, a plurality of calculated steam velocity levels that do not exceed the steam velocity limit;
   select a lowest candidate pressure level of the plurality of candidate pressure levels, wherein the lowest candidate pressure level is associated with one of the plurality of calculated steam velocity levels that does not exceed the steam velocity limit; and
   pressurize the HRSG steam circuit to the selected lowest candidate pressure level to pre-warm the HRSG steam circuit prior to steam admission to the steam turbine.

2. The pressure controlling computing device of claim 1, further configured to:
   open at least one steam bypass valve associated with the HRSG steam circuit upon pressurizing the HRSG steam circuit to the selected lowest candidate pressure level.

3. The pressure controlling computing device of claim 2, further configured to:
   receive a plurality of pipe and steam temperature data associated with each section of a plurality of sections of the HRSG steam circuit;
   identify an admission temperature level associated with at least one section of the plurality of sections; and
   determine that a steam temperature level meets the admission temperature level associated with the at least one section, the steam temperature level associated with the plurality of pipe and steam temperature data;
   initiate steam admission to the at least one section.

4. The pressure controlling computing device of claim 1, further configured to:
   identify a pressure buffer associated with the HRSG steam circuit; and
   adjust the selected lowest candidate pressure level with the pressure buffer.

5. The pressure controlling computing device of claim 1, further configured to:
   monitor the measured plant operating values associated with the HRSG steam circuit to identify a variance between actual operating values and target operating values; and
   dynamically adjust the selected lowest candidate pressure level based on the identified variance.

6. The pressure controlling computing device of claim 1, further configured to:
   identify a projected drum swell associated with the selected lowest candidate pressure level; and
   assess projected drum swell, and adjust the selected lowest candidate pressure level upwards as necessary to satisfy a drum swell threshold.

7. The pressure controlling computing device of claim 1, further configured to:
   identify a performance impact on a mist eliminator associated with steam-water separation efficiency at the selected lowest candidate pressure level; and
   assess mist eliminator performance and adjust the selected lowest candidate pressure level upwards as necessary to satisfy a mist eliminator performance threshold.

8. A method for adjusting floor pressure levels of HRSG steam circuits using the device of claim 1, said method comprising: receiving a plurality of measured plant operating values associated with a HRSG steam circuit; identifying a plurality of candidate pressure levels for use in pressurizing the HRSG steam circuit; determining a calculated steam velocity level for each of the plurality of candidate pressure levels; identifying a steam velocity limit for a steam piping section of the HRSG steam circuit; selecting a lowest pressure level of the plurality of candidate pressure levels, wherein the lowest pressure level is associated with a determined calculated steam velocity level that does not exceed the identified velocity limit; and pressurizing the HRSG steam circuit to the selected lowest pressure level.

9. The method of claim 8, further comprising:
   opening at least one steam bypass valve associated with the HRSG steam circuit upon pressurizing the HRSG steam circuit to the selected lowest pressure level.

10. The method of claim 9, further comprising:
   receiving a plurality of pipe and steam temperature data associated with each section of the HRSG steam circuit supply to each steam turbine section;
   identifying an admission temperature level associated with the steam turbine section;
   determining that a steam temperature level meets the admission temperature level, the steam temperature level associated with the plurality of steam temperature data; and
   initiating steam admission to the steam turbine section.

11. The method of claim 8, further comprising:
   identifying a pressure buffer associated with the HRSG steam circuit; and
   adjusting the selected lowest pressure level with the pressure buffer.

12. The method of claim 8, further comprising:
   monitoring the measured plant operating values associated with the HRSG steam circuit to identify a variance between actual operating values and target operating values; and
   dynamically adjusting the selected lowest pressure level based on the identified variance.

13. The method of claim 8, further comprising:
   identifying a projected drum swell associated with the selected lowest pressure level; and
   validating that the drum swell does not exceed a drum swell threshold.

14. The method of claim 8, further comprising:
   identifying a performance impact on a mist eliminator associated with steam-water separation efficiency at the selected lowest pressure level; and
   validating that the performance impact does not exceed a steam-water separation efficiency threshold.

15. At least one non-transitory computer-readable storage media for adjusting floor pressure levels of HRSG steam circuits during a pre-warming phase, the storage media having computer-executable instructions embodied thereon, wherein when executed by at least one processor of a pressure controlling computing device, the computer-executable instructions cause the processor to:
   receive a plurality of measured plant operating values associated with a HRSG steam circuit;
   identify a plurality of candidate pressure levels for use in pressurizing the HRSG steam circuit to a steam pressure that is below a floor pressure suitable for steam admission to a steam turbine;
   determine a calculated steam velocity level for each of the plurality of candidate pressure levels;
   identify a steam velocity limit for a steam piping section of the HRSG steam circuit;
   compare each calculated steam velocity level to the identified steam velocity limit;
   identify, based upon the comparison, a plurality of calculated steam velocity levels that do not exceed the steam velocity limit;
   select a lowest candidate pressure level of the plurality of candidate pressure levels, wherein the lowest candidate pressure level is associated with one of the plurality of calculated steam velocity levels that does not exceed the steam velocity limit; and
   pressurize the HRSG steam circuit to the selected lowest candidate pressure level to pre-warm the HRSG steam circuit prior to steam admission to the steam turbine.

16. The at least one non-transitory computer-readable storage media of claim 15, wherein the computer-executable instructions further cause the processor to:
   open at least one steam bypass valve associated with the HRSG steam circuit upon pressurizing the HRSG steam circuit to the selected lowest candidate pressure level.

17. The at least one non-transitory computer-readable storage media of claim 16, wherein the computer-executable instructions further cause the processor to:
  receive a plurality of pipe and steam temperature data associated with each section of a plurality of sections of the HRSG steam circuit;
  identify an admission temperature level associated with at least one section of the plurality of sections;
  determine that a steam temperature level meets the admission temperature level associated with the at least one section, the steam temperature level associated with the plurality of pipe and steam temperature data; and
  initiate steam admission to the at least one section.

18. The at least one non-transitory computer-readable storage media of claim 15, wherein the computer-executable instructions further cause the processor to:
  identify a pressure buffer associated with the HRSG steam circuit; and
  adjust the selected lowest candidate pressure level with the pressure buffer.

19. The at least one non-transitory computer-readable storage media of claim 15, wherein the computer-executable instructions further cause the processor to:
  monitor the measured plant operating values associated with the HRSG steam circuit to identify a variance between actual operating values and target operating values; and
  dynamically adjust the selected lowest candidate pressure level based on the identified variance.

20. The at least one non-transitory computer-readable storage media of claim 15, wherein the computer-executable instructions further cause the processor to:
  identify a projected drum swell associated with the selected lowest candidate pressure level; and
  assess projected drum swell, and adjust the selected lowest candidate pressure level upwards as necessary to satisfy a drum swell threshold.

21. The at least one non-transitory computer-readable storage media of claim 15, wherein the computer-executable instructions further cause the processor to:
  identify a performance impact on a mist eliminator associated with steam-water separation efficiency; and
  assess mist eliminator performance and adjust the selected lowest candidate pressure level upwards as necessary to satisfy a mist eliminator performance threshold.

* * * * *